Dec. 17, 1929.   C. E. EKLIND ET AL   1,739,789
WEATHERPROOFING STRUCTURE FOR CAR DOORS
Filed Oct. 22, 1927
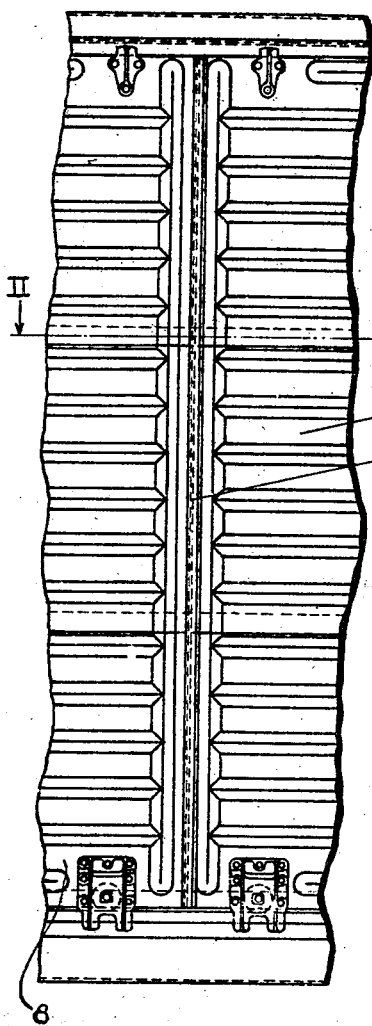
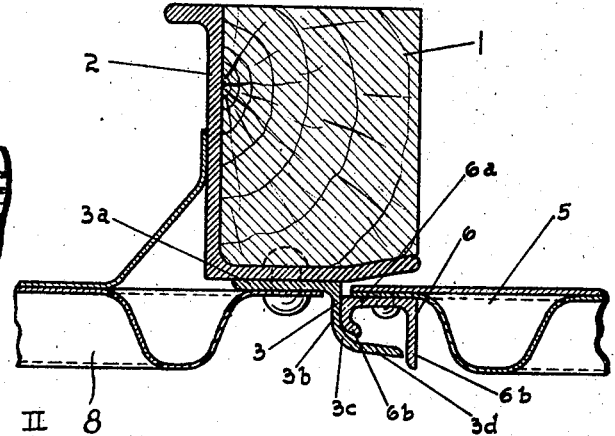
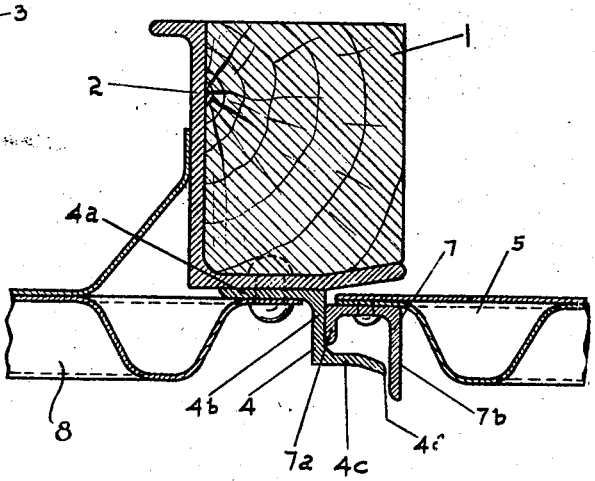
~INVENTORS~
CARL E. EKLIND
KENNETH J. TOBIN
ATTYS Patented Dec. 17, 1929

1,739,789

UNITED STATES PATENT OFFICE

CARL E. EKLIND AND KENNETH J. TOBIN, OF CHICAGO, ILLINOIS, ASSIGNORS TO CAMEL COMPANY, OF CHICAGO, ILLINOIS, A CORPORATION OF ILLINOIS

WEATHERPROOFING STRUCTURE FOR CAR DOORS

Application filed October 22, 1927. Serial No. 227,949.

This invention relates to a weather proofing structure for car doors, and concerns itself primarily with a pair of co-acting weather strips which are adapted to come into such co-acting relation when the door is closed to effectively exclude the weather irrespective of any distortions or irregularities in the abutting portions of the weather strips. It is well known that the severe strains set up in cars in transit, especially where a bad and uneven road bed is encountered, frequently causes a distortion of various parts including the weather strips. However, according to this invention, the weather will always be excluded at the edges of the door irrespective of such distortion.

The invention comprises the novel structure and combination of parts hereinafter described and more particularly pointed out and defined in the appended claims.

In the accompanying drawings, which illustrate a preferred embodiment of this invention and in which similar reference numerals refer to similar features in the different views:

Figure 1 is a fragmentary elevational view of a house car illustrating the weather proofing structure involving this invention.

Figure 2 is an enlarged sectional view taken substantially upon the line II—II of Figure 1.

Figure 3 is a view similar to Figure 2 illustrating a modified form of the invention.

As shown on the drawings:

The weather proofing structure involving this invention is adapted for use upon the front edge of a door or upon the rear edge of a door, or it may be equally well used for excluding the weather between a pair of cooperating sliding doors. The latter application only has been illustrated since the other applications thereof will be readily apparent as the description proceeds.

In the drawings, there is shown a front door jamb 1 which is preferably protected by an angle 2, and which in the present instance is shown as connected to and movable with a supplemental car door 8. A deformed weather metal strip 3 as shown in Figure 2, or the deformed weather strip shown in Figure 3 is adapted to be attached to the jamb 1. It will be noted that the weather strip 3 has an attached flange $3^a$ and an outwardly projecting flange $3^b$ having a curvature $3^c$ at its corner, said flange $3^b$ being rearwardly directed in a slightly outwardly sloping plane.

The main car door is designated by the reference numeral 5 and has a front edge weather strip 6 which may be of the form as shown in Figure 2, or which may be of the form 7 as shown in Figure 3. The weather strip 6 consists of a metal member having an attached flange $6^a$ and an outwardly and rearwardly bent terminal lip $6^b$ which is adapted for entering beneath the flange $3^d$ of the weather strip 3. This weather strip 6 has upon its rear edge an outwardly directed flange $6^b$ which is adapted when the door is closed to substantially abut the rear edge of the flange $3^d$, as shown in Figure 2, in order to exclude the weather from the junction of the weather strips 3 and 6.

The weather strip 4 shown in Figure 3 has an attaching flange $4^a$ which is secured to the door jamb and a vertical portion $4^b$ extending at right angles to the attaching portion $4^a$ and an outer rearwardly directed guard flange $4^c$ which has a terminal outward slope as indicated at $4^d$. The weather strip 7 shown in Figure 3 is substantially similar to the weather strip 6 with the exception that it has a straight terminal flange $7^a$ instead of the terminal flange $6^b$ shown in Figure 2. The rear edge of the weatherstrip 7 has an outwardly directed flange $7^b$ which serves the same purpose and function as the flange $6^b$ in Figure 2. It will be noted that the weather strips 6 and 7 are secured to the front edge of the door by rivets extending through the web between the two outstanding flanges.

Of course under certain conditions, it may only be desirable to use the main door 5. In such case the jamb 1 and supplemental door 8 may be treated as a part of the permanent structure of the car. Further, the overhanging weather strip may be put upon the rear edge of the door and the other weather strip may be placed at the rear margin of the door opening if it is desired to exclude weather at the rear of the door.

It will be appreciated that when a car equipped with these weather strips is in transit, the weather strips may become distorted so that the abutting faces do not form a tight joint, with the result that snow and rain or the like may enter between the distorted parts. However, the guard flange 6b or the guard flange 7b, depending upon which of the two weather strips is used, will in connection with the overhanging flange of the weather strip exclude the weather from entering thru such distorted parts.

We are aware that many changes may be made, and numerous details of construction may be varied through a wide range without departing from the principles of this invention, and we therefore do not purpose limiting the patent granted hereon, otherwise than necessitated by the prior art.

We claim as our invention:

1. A weather proofing structure for a sliding car door, comprising a vertical strip having an attaching web, a short flange extending outwardly at substantially a right angle at the forward edge of said web, a longer flange extending outwardly at substantially a right angle from the rear edge of said web, and a cooperating weather strip adjacent the front edge of said door comprising an angular member having an attaching flange, a web extending outwardly at substantially a right angle to said attaching flange for abutting relation with said short flange and a rearwardly directed flange extending substantially to said longer flange.

2. A weather proofing structure comprising a vertical strip having an attaching flange, a web at substantially a right angle to said attaching flange and a rearwardly extending flange in combination with a vertical strip having an attaching web, a short flange extending outwardly at one edge of said web for abutting relation with the web of said first strip, and a longer outwardly extending flange at the other edge of said web extending beyond the said rearwardly extending flange.

In testimony whereof, we have hereunto subscribed our names.

CARL E. EKLIND.
KENNETH J. TOBIN.